April 21, 1925.
L. KLINGER
1,534,179
CLEANING DEVICE
Filed May 21, 1924
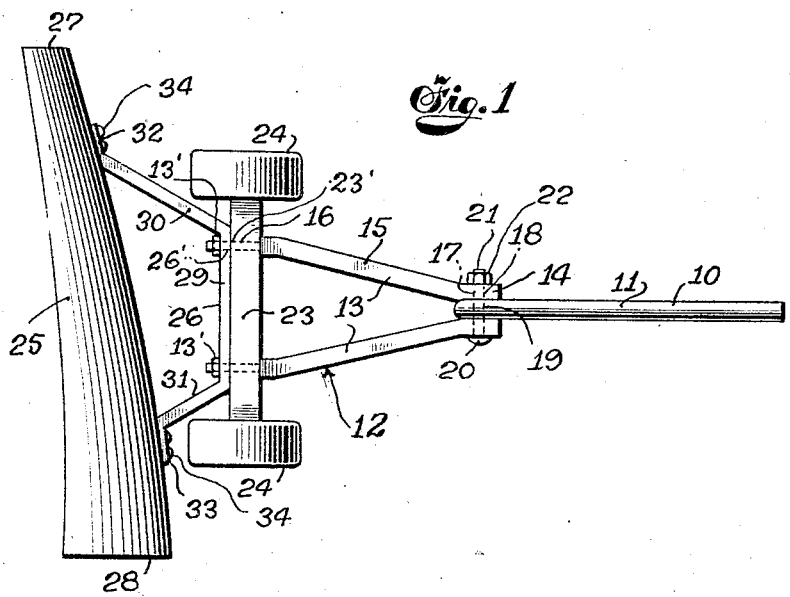
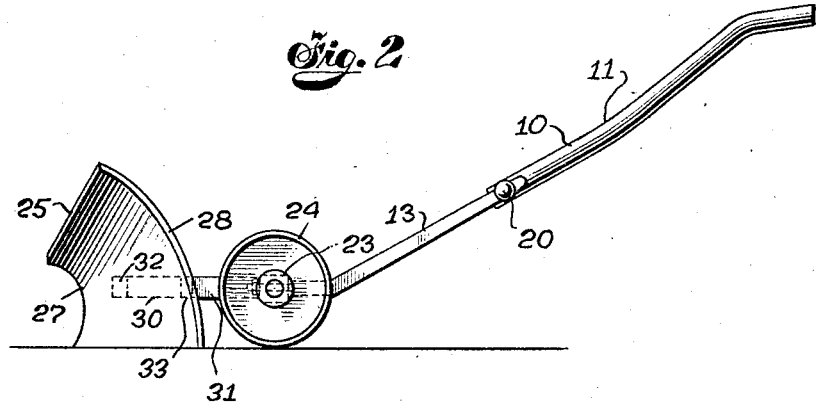
INVENTOR
Louis Klinger
BY Edward M. Evarts
his ATTORNEY Patented Apr. 21, 1925.

1,534,179

UNITED STATES PATENT OFFICE.

LOUIS KLINGER, OF BROOKLYN, NEW YORK.

CLEANING DEVICE.

Application filed May 21, 1924. Serial No. 714,770.

*To all whom it may concern:*

Be it known that I, LOUIS KLINGER, a citizen of the United States, and a resident of the borough of Brooklyn, Kings County, city and State of New York, have invented an Improvement in Cleaning Devices, of which the following is a specification.

My present invention relates to portable cleaning devices, as for snow and the like, and aims to provide devices of the character designated above which shall be simple in construction, easy to assemble and to disassemble, which shall be easy and convenient to operate, and which shall be exceptionally efficient for the desired purpose.

In the accompanying specification I shall describe, and in the annexed drawing show, an illustrative embodiment of the present invention. It is, however, to be clearly understood that my invention is not limited to the illustrative embodiment thereof herein shown and described for purposes of illustration only.

Referring to the drawing, wherein I have illustrated the aforesaid illustrative embodiment of the present invention:

Fig. 1 is a plan view of said embodiment; and

Fig. 2 is a side view of the same.

Before describing in detail the aforesaid illustrative embodiment of the present invention, it may be desirable briefly to point out the disadvantages of the prior devices hitherto manufactured and sold for the same general purpose. These devices are usually complicated and proportionately expensive; they are hard to assemble and to disassemble for repair or replacement purposes; they are difficult to operate; and are comparatively inefficient for the desired purpose. In particular, the cleaning elements of such devices are not of such conformation as to serve properly and efficiently to cut into, collect and expel the snow or the like, nor do such devices operate with the desired ease and quickness.

Referring to the aforesaid illustrative embodiment of the present invention, and more particularly to the drawing illustrating the same, 10 indicates an operating member which is preferably in the form of a suitable length of iron or other metal pipe bent, as at 11, for ease in manipulating the same. At 12 I have generally indicated attaching means, such means in the present instance preferably comprising a plurality of members 13 which are preferably inclined with respect to the operating member 10. Each attaching member 13 preferably consists of an upper end portion 14, an intermediate main portion 15, and a lower threaded connecting portion 16. The upper end portions 14 of the members 13 are rigidly attached to the operating member 10, as by means of a threaded bolt 17 passing through suitable apertures 18 in the portions 10 and through an aperture 19 in the operating member 10. The bolt 17 is provided with a head 20 at one end thereof, and is threaded, as indicated at 21, at the other end thereof, for engagement with a correspondingly threaded nut 22, which serves to hold the various portions of the device thus far mentioned in proper relation with respect to each other.

At 23 I have indicated a shaft which carries for suitable rotation on the same the supporting wheels 24. At 25 I have generally indicated the cleaning element carried by the supporting means generally indicated by reference character 26. The cleaning element 25 is preferably tapered, enlarging gradually from its farther end 27 to its nearer end 28, as shown more clearly in Fig. 1 of the drawing. The cleaning element 25 is preferably also of curvilinear cross section, either vertically or horizontally, but preferably both vertically and horizontally. For this purpose I prefer that the conformation of the cleaning element 25 shall correspond, more or less, to a portion or element of a spiral surface, as I have discovered that a cleaning element having this surface conformation is remarkably efficient for the desired purpose.

The supporting member 26 for the cleaning element 25 is preferably made up of an integral bent iron or other metal bar consisting of the cross member 29, the inclined integral side members 30 and 31, of which the side member 30 is preferably substantially longer than the side member 31, and the transverse attaching members or portions 32 and 33. By means of suitable bolts and nuts, or other desirable fastening means, generally indicated by reference character 34, the transverse portions 32 and 33 of the supporting member 26 are suitably removably attached to the cleaning element 25. It may here also be stated that the threaded end portions 16 of the attaching members 13 are passed through suitable apertures 23' in the shaft 23 and through suitable apertures 26' in the cross member 29 of the supporting means 26, and cooperate with the nuts 13' to removably fasten the various portions of the device together.

The manner of assembling the device described above will be substantially clear from the foregoing description. It will be noted that the device is exceedingly simple in construction and may be readily assembled or disassembled for repair or replacement. In operation, the arrangement of the operating member and the shaft carrying the wheels, with respect to the cleaning element, is such as to render the operation of the device very convenient and the cleaning operation very efficient. The cleaning element itself is so constructed and designed as to conduct the desired cleaning operation with the maximum efficiency. Where the device is used for removing snow, the cleaning element serves in a remarkably efficient manner to cut into the snow, to collect the snow on the same, and to expel the snow with little likelihood of clogging up the device or of difficult and inefficient operation.

What I claim as my invention is:

1. A portable cleaning device for snow or the like, comprising, in combination, an operating member, a shaft, supporting wheels rotatably carried by said shaft, a cleaning element, supporting means for said cleaning element, and attaching means associated with said operating member and passing through said shaft and said supporting means.

2. A portable cleaning device for snow or the like, comprising, in combination, an operating member, a shaft, supporting wheels rotatably carried by said shaft, a cleaning element, supporting means for said cleaning element comprising a cross member having a plurality of integral side members and an integral transverse member associated with each of said side members, and removable attaching means associated with said operating member and passing through said shaft and said supporting means.

3. A portable cleaning device for snow or the like, comprising, in combination, an operating member, a shaft, supporting wheels rotatably carried by said shaft, a cleaning element, supporting means for said cleaning element comprising a cross member having a plurality of integral inclined side members of unequal length and an integral transverse member associated with each of said side members, and removable attaching means associated with said operating member and passing through said shaft and said supporting means.

4. A portable cleaning device for snow or the like, comprising, in combination, an operating member, a shaft, supporting wheels rotatably carried by said shaft, a cleaning element comprising a tapering member of curvilinear vertical cross section, supporting means for said cleaning element, and attaching means associated with said operating member and passing through said shaft and said supporting means.

5. A portable cleaning device for snow or the like, comprising, in combination, an operating member, a shaft, supporting wheels rotatably carried by said shaft, a cleaning element comprising a tapering member of curvilinear horizontal and vertical cross section, supporting means for said cleaning element comprising a cross member having a plurality of integral side members and an integral transverse member associated with each of said side members, and removable attaching means associated with said operating member and passing through said shaft and said supporting means.

6. A portable cleaning device for snow or the like, comprising, in combination, an operating member, a shaft, supporting wheels rotatably carried by said shaft, a cleaning element comprising a tapering member of spiral-like conformation and of curvilinear horizontal and vertical cross section, supporting means for said cleaning element comprising a cross member having a plurality of integral inclined side members of unequal length and an integral transverse member associated with each of said side members, and removable attaching means associated with said operating member and passing through said shaft and said supporting means.

7. In a portable cleaning device for snow or the like, attaching means comprising a cross member, integral inclined side members associated with said cross member, and an integral transverse member associated with each of said side members.

8. In a portable cleaning device for snow or the like, attaching means comprising a cross member, integral inclined side members associated with said cross member, one of said side members being substantially longer than the other and an integral transverse member associated with each of said side members.

9. In a portable cleaning device for snow or the like, a tapering cleaning element of spiral-like conformation and of curvilinear vertical cross section.

10. In a portable cleaning device for snow or the like, a tapering cleaning element of spiral-like conformation and of curvilinear horizontal and vertical cross section.

In testimony whereof I have signed my name to this specification this 20th day of May, 1924.

LOUIS KLINGER.